United States Patent [19]

Oughton

[11] 4,211,695

[45] Jul. 8, 1980

[54] PROCESS FOR THE TREATMENT OF COMMINUTED OATS

[75] Inventor: Richard W. Oughton, Odessa, Canada

[73] Assignee: Du Pont of Canada, Limited, Montreal, Canada

[21] Appl. No.: 6,766

[22] Filed: Jan. 26, 1979

Related U.S. Application Data

[63] Continuation-in-part of Ser. No. 747,734, Dec. 6, 1976, abandoned.

[30] Foreign Application Priority Data

Dec. 16, 1975 [GB] United Kingdom ............... 51498/75

[51] Int. Cl.$^2$ ................................................ A23J 1/12
[52] U.S. Cl. .............................. 260/123.5; 260/112 R; 426/656
[58] Field of Search ......................... 260/123.5, 112 R

[56] References Cited

U.S. PATENT DOCUMENTS

| | | | |
|---|---|---|---|
| 2,466,261 | 4/1949 | Musher | 260/112 R |
| 3,520,868 | 7/1970 | Henderson et al. | 260/112 R |
| 3,615,657 | 10/1971 | Gastrock et al. | 426/430 |
| 3,869,438 | 3/1975 | Finley et al. | 260/123.5 |
| 3,972,861 | 8/1976 | Gardner et al. | 260/123.5 |
| 4,053,492 | 10/1977 | Boocock et al. | 260/123.5 |

FOREIGN PATENT DOCUMENTS 864538  2/1971 Canada.
905909  7/1972 Canada.

*Primary Examiner*—Walter C. Danison

[57] ABSTRACT

A process for the treatment of comminuted oats so as to effect separation of the comminuted oats into fractions differing in composition is disclosed. The process comprises admixing comminuted oats, or fractions derived therefrom, with an organic solvent for oat oil and subjecting the admixture, in the form of a slurry, to the influence of centrifugal force in, for example, a centrifuge, including continuous or semi-continuous centrifuges, and/or a hydrocyclone. In an embodiment the oats are oats that have not been subjected to a heat treatment. Examples of suitable solvents are pentane, hexane, heptane, cyclohexane and alcohols of 1–4 carbon atoms. The products obtainable include bran, oat oil, flour and protein-enriched or protein deficient flours. In particular embodiments flours having greater than 80% or less than 5% protein are obtainable. The products have a variety of uses in the food industry.

25 Claims, No Drawings

PROCESS FOR THE TREATMENT OF COMMINUTED OATS

CROSS-REFERENCE TO RELATED APPLICATION

This application is a continuation-in-part of Ser. No. 747,734 filed Dec. 6, 1976, now abandoned.

The present invention relates to an improved process for the treatment of comminuted oats so as to effect separation of the comminuted oats into fractions differing in composition. In particular, the present invention relates to the treatment of comminuted oats so as to separate the comminuted oats into a so-called "flour" fraction, a so-called "bran" fraction and an oil, and into products derived therefrom, in which the flour is essentially free of gum. The present invention also relates to the treatment of comminuted oats, or flour or bran fractions derived therefrom, so as to obtain fractions having a range of protein contents, especially fractions of high and low protein contents.

As used herein the expression "groats" refers to the kernel of the oat, the expression "flour" refers to the endosperm of the oat and the expression "bran" refers to the bran of the oat; such bran may have endosperm attached thereto as is exemplified hereinafter. The expression "gum" refers in particular to water-soluble gum.

Oats are a potential source of a wide variety of useful products. Examples of such products are flour, starch, protein isolate, protein-enriched flour, bran, gum and oil. Traditional techniques used in the cereal grain processing industry are frequently difficult to use with oats. For example, milling techniques are difficult to use with oats because of process problems relating to the presence of oil in the oats. Moreover, unless the oats are de-oiled prior to milling, such milling techniques would result in the formation of flour and bran fractions containing oil which may result in rancidity problems on storage of the flour and bran.

Gum, together with some protein and starch, may be removed in part by treatment of oats with water, the resultant dilute aqueous solution of gum then requiring treatment prior to disposal or for recovery of the gum. Protein may be extracted from comminuted oats with aqueous solutions, especially alkaline solutions. However gum present in the oats may also be extracted into solution and the resultant solutions may be viscous and cause process problems, especially in the separation of solids from the aqueous solutions.

The composition and properties of water-soluble gums obtained from cereal grains are discussed by B. L. D'Appolonia in a paper presented at the symposium on "Industrial Uses of Cereals" held in conjunction with the 58th Annual Meeting of the American Association of Cereal Chemists, November 1973.

A process for the separation of acid-soluble protein from comminuted oats, and techniques for the recovery of starch, gum and the like in related processes, is described in Canadian Application No. 245,163 of A. Bell, J. R. B. Boocock and R. W. Oughton, filed Feb. 4, 1976. Techniques for the separation of oil from comminuted oats are known; such techniques are discussed in the aforementioned application of A. Bell et al. A process for isolating protein from a pulverized oil seed using liquid fluorocarbons is disclosed in U.S. Pat. No. 3,869,438 of J. W. Finley et al, which issued Mar. 4, 1975.

A process for the separation of a flour fraction, a bran fraction and oil from comminuted oats in which gum does not cause significant process problems and in which the flour is essentially free of gum is disclosed in Canadian Application 254,864 of R. W. Oughton, filed June 15, 1976. However, the process disclosed by R. W. Oughton is capable of improvement.

Processes for the solvent-extractive milling of maize or corn, wheat, rye and the sorghum grains to remove the bran coat from whole kernels of such grains followed by comminution of the whole milled kernels and for the separation of so-called fibrous, proteinaceous, endosperm and/or starch fractions derived from such grains are disclosed by T. B. Wayne in Canadian Pat. Nos. 864,538, which issued Feb. 23, 1971, and 905,909 and 905,910, both of which issued July 25, 1972.

A need exists for the discovery of a process for the treatment of comminuted oats, especially for the production of flour and/or protein, that is less susceptible to process problems relating to the presence of oil and gum in the oats.

An improved process for the separation of a flour fraction, a bran fraction and oil, especially protein-enriched flours and protein-deficient flours, from comminuted oats has now been found.

Accordingly the present invention provides a process for the separation of comminuted oats into fractions differing in composition, said process comprising:
(a) admixing comminuted oats with an organic solvent, said solvent being capable of extracting oat oil from said oats;
(b) forming a slurry of said admixture of comminuted oats and solvent; and
(c) subjecting the slurry to the influence of centrifugal force and thereby separating the comminuted oats in said slurry into at least two fractions, said fractions differing in composition.

The present invention also provides a process for the separation of comminuted oats into fractions differing in composition, said process comprising:
(a) admixing an oat fraction, derived from said comminuted oats, with an organic solvent, said solvent being a solvent capable of extracting oat oil from oats.
(b) forming a slurry of said admixture of oat fraction and organic solvent; and
(c) subjecting the slurry to the influence of centrifugal force and thereby separating said oat fraction into at least two fractions, said fractions differing in protein content.

In addition the present invention provides a process for the separation of comminuted oats into fractions differing in composition, said process comprising:
(a) admixing an oat fraction, derived from comminuted oats, with an organic solvent, said solvent being a solvent capable of extracting oat oil from oats;
(b) subjecting said admixture to the influence of centrifugal force in a centrifuge and thereby forming a centrifuge cake of said oat fraction;
(c) separating said cake in the substantial absence of said solvent into at least two layers, the protein content of at least one of said layers being different from the protein content of at least one of said other layers.

Furthermore the present invention provides a process for the separation of comminuted oats, or fractions derived therefrom, into fractions differing in composition, said separation being carried out in the presence of an organic solvent, the improvement comprising utilizing oats which have not been subjected to heat treatment.

The comminuted oats used in the process of the present invention are preferably obtained from dehulled oats. Techniques for dehulling oats are known in the art. The dehulled oats, herein generally referred to as groats, are comminuted in order to facilitate extraction of oil and to facilitate separation of the subsequently formed slurry of comminuted groats and organic solvent into a flour fraction and a bran fraction. The required particle size of the comminuted groats will depend in particular on the technique to be used to separate the comminuted groats in the slurry into fractions differing in composition. For example, if a hydrocyclone is used to separate the comminuted groats into fractions the particle size of the comminuted groats must be sufficiently small to allow the hydrocyclone to operate smoothly and efficiently and without clogging or plugging of the hydrocyclone. Conventional techniques, for example, pinmilling, hammer milling and other shearing techniques would appear to produce acceptable comminuted groats.

In the process of the present invention the comminuted groats are admixed with a solvent for the oil in the oats in order to facilitate extraction of the oil from the comminuted groats i.e. to de-oil the comminuted groats. The solvents used must be acceptable for use with foodstuffs, e.g. be non-toxic at the levels remaining in the products subsequently produced, not cause the formation of toxic materials in the product and not have a significant deleterious effect on the nutritional value of the product, and must be capable of permitting separation of the flour and bran fractions. The amount and type of solvent remaining in products offered for sale must be acceptable to the appropriate health authorities, as will be understood by those skilled in the art. Examples of solvents are pentane, hexane, heptane, cyclohexane and alcohols of 1-4 carbon atoms, and mixtures thereof; as used herein the solvents hexane and heptane include those solvents referred to in the food industry as hexane and heptane. The preferred solvent is hexane. The present invention will generally be described hereinafter with reference to hexane as the solvent.

The admixing of the comminuted groats and hexane is preferably carried out with agitation, e.g., stirring. In a preferred embodiment of the process of the present invention the comminuted groats and hexane are admixed and then agitated so as to form a slurry of the comminuted groats and hexane. The time between admixing the comminuted groats and hexane and forming the slurry of comminuted groats and hexane may be very short or alternatively the admixture may be maintained as such for a significant period of time before the slurry is formed. The period of time during which the comminuted groats and hexane are in contact, i.e., the time as an admixture and as a slurry, should be such that the desired degree of extraction of oil from the comminuted groats is achieved, the period of time being dependent in part on the actual technique of extraction. Generally a slurry of comminuted groats and hexane will be formed essentially on admixing.

The comminuted groats and hexane may be admixed and/or formed into a slurry under conditions that result in further comminution of the groats. Thus, the comminuted groats admixed with the hexane may be of a particle size that is not suitable for the subsequent separation step and the necessary additional comminution prior to separation of the slurry into at least two fractions may occur while the comminuted groats and hexane are admixed or in the form of a slurry. In such embodiments it may be preferable to incorporate means for separation of oversize particles from the admixture and/or slurry, especially just prior to the separation of the comminuted groats in the slurry into fractions, and to subject such particles to further comminution. The utilization of the admixture and/or the slurry for additional comminution of the comminuted groats may be a factor in the determination of the period of time between the admixing of the comminuted groats and hexane and the subsequent separation of the comminuted groats into at least two fractions.

In order to effect separation of the comminuted groats into fractions, the slurry is subjected to centrifugal force. The means used to subject the slurry to centrifugal force is a centrifugal separator, preferably a centrifugal separator capable of being operated on a continuous or semi-continuous basis. Examples of centrifugal separators are continuous centrifuges including semi-continuous centrifuges, and, in particular, hydrocyclones.

In order to effect separation of the comminuted groats into fractions in a hydrocyclone, the slurry of comminuted groats and hexane is fed to the hydrocyclone whereupon the slurry is subjected to centrifugal force. Under such conditions, fractionation of the comminuted groats in the slurry tends to occur. The operation of the hydrocyclone so as to obtain a desired fractionation of the comminuted groats in the slurry will depend on a number of process variables. Examples of such variables are the degree of comminution of the comminuted groats, the amount of solid material in the slurry, the pressure drop across the hydrocyclone, the ratio of the flows through the so-called "underflow" and "overflow" outlets, the difference in density between the solvent and the particles of the comminuted groats, the viscosity of the solvent and the like, as will be understood by those skilled in the art. The operation of the hydrocyclone is adjusted so that a desired fractionation of the comminuted groats in the slurry fed to the hydrocyclone is obtained. In particular, the hydrocyclone is operated so that a bran fraction, in hexane, flows out the underflow outlet and a flour fraction, in hexane, flows out the overflow outlet. Preferably one fraction contains at least 20% and in particular at least 40% of the comminuted oats.

The flour fraction may be separated from the flour fraction/hexane mixture by known techniques for separating a solid from a solution. For example, the flour fraction may be separated from the flour fraction/hexane mixture by centrifuging techniques. As the hexane contains dissolved oil, it may be desirable to wash the flour fraction after separation so as to remove any oil absorbed on the flour. The oil may be recovered from the oil-containing hexane solution by removal of the hexane. Similarly the bran fraction may be recovered from the bran fraction/hexane mixture by removal of the hexane. In these operations the hexane is preferably recovered and re-used in the separation of the flour and bran fractions from the comminuted groats. Alternatively, the oil-containing hexane solution may at least in part, be used in the separation of the flour and bran fractions from the comminuted groats.

Depending on the desired products, the flour and bran fractions may, either before or after separation from the hexane, be subjected to further comminution and/or further separation using, for example, a hydrocyclone. Thus the separation of the comminuted groats into fractions may involve the multiple use of, for example, hydrocyclones, such multiple use may be in a sequential manner and may include recycle of fractions. Other methods of separation may be used in conjunction with separations involving the use of hydrocyclones, e.g., a flour fraction containing a small amount of bran may advantageously be treated with a screen or classifier. The process of the present invention can therefore be used for the separation of comminuted groats into flour fractions containing flour of varying properties, especially varying protein contents, and into bran fractions of varying properties. Such may be advantageous for some end uses.

The bran fraction in the process of the present invention may be comprised of bran particles having endosperm adhered thereto. The bran fraction may be subjected to further comminution in the presence or absence of hexane and either returned to the admixture of comminuted groats and hexane for further separation into flour and bran fractions or independently separated into further flour and bran fractions. Bran fractions of varying endosperm content are obtainable.

The oil obtained in the process of the present invention may be turbid and it may be desirable to clarify the oil. The oil may be clarified by techniques known in the art or by mixing with isopropanol especially isopropanol containing hydrogen peroxide, agitating and then removing any solid material, e.g. by centrifuging. A clear brown oil is obtainable. The solids removed on centrifuging are believed to contain significant amounts of phospholipids and may be suitable for use, for example, as emulsifiers.

The flour fraction that is separated by the process of the present invention is essentially free of gum. In addition the flour fraction is essentially free of oil. The water-soluble gums, which are in the bran fraction, are recoverable. The products of the process of the present invention are believed to be useful in the food industry either as such or as a source of other products.

The major components of the flour fraction are starch and protein. In addition to separation under the influence of centrifugal force, the flour fraction is capable of being separated into fractions of varying starch and protein contents using air classification techniques. Protein and starch concentrates may be also obtained from the flour fraction by extracting the flour with aqueous acidic or alkaline solutions. A high proportion of the protein in the flour fraction may be extracted by slurrying the flour fraction in such aqueous solutions. The pH of the aqueous solution is preferably at least 9.0 and especially about 11.0 if the solution is alkaline and about 2.0 if the solution is acidic. Examples of suitable alkalis for the adjustment of pH are sodium hydroxide and potassium hydroxide. Examples of suitable acids are phosphoric acid, hydrochloric acid and citric acid. As discussed herein gums, especially water-soluble gums in the oats, are separated in the bran fraction in the process described above and the flour fraction obtained is essentially free of gum. Thus processes for the extraction of protein from the flour fraction of the process of the present invention may be operated at low solution viscosities, which is most advantageous from a processing and especially a product separation point of view. The solid material in the protein extraction solution may be separated from the solution using, for example, centrifuging techniques. It is likely desirable to wash or re-slurry the solids with water to separate absorbed solubilized protein and to re-separate the solids. The solid material is comprised primarily of starch. If the starch contains a minor amount of bran or the like it may be desirable to subject it to, for example, sieving, washing or air classification to purify the starch.

The solubilized protein obtained on extraction of the flour fraction may be recovered by, for example, isoelectric precipitation. The pH of the solubilized protein solution is adjusted to about 3.5–4.5 with alkali, e.g., sodium hydroxide, or acid, e.g., phosphoric acid, as required. The precipitate of protein obtained may be separated by, for example, centrifuging the solution. Protein may also be obtained by freeze drying the solution of solubulized protein. This may be especially useful for recovery of acid-soluble protein especially from solutions at the pH at which it is desired that the protein be soluble. The properties of the protein, including the colour of the protein may depend on the technique of extracting and separating the protein. Protein obtained by alkali or acid extraction is believed to be stable in hot aqueous acidic solutions. Acid-soluble protein obtainable from the flour fraction, as described herein, may be preferable to that obtainable directly from de-oiled groats. If the protein is to be blended with another substance, e.g., flour, it may be preferable to extract the protein from the flour fraction with an acidic solution and freeze dry the protein as the protein so obtained may be whiter than that obtained by isoelectric precipitation.

Protein may also be extracted from the flour fractions using aqueous solutions of substantially neutral pH. Such protein is capable of being precipitated in hot water.

While the present invention has been described hereinbefore with particular reference to the separation of comminuted groats into fractions using in particular a hydrocyclone, the present invention is not limited thereto. In a preferred embodiment of the invention the material which is subjected to the influence of centrifugal force is an oat fraction that has been obtained from comminuted groats by means other than the use of centrifugal force. For example the oat fraction, which may be for example a bran fraction or a flour fraction, may be obtained by classifying admixtures of comminuted groats and a solvent, for example, hexane. The classifying of admixtures of comminuted groats and solvents and other techniques for the separation of oat fractions are disclosed in the aforementioned Canadian patent application No. 254,864.

The use of the influence of centrifugal force on fractions derived from comminuted groats, rather than on comminuted groats per se, may be advantageous in that process problems associated with large particles e.g. the clogging of hydrocyclones, may be reduced or avoided. The treatment of bran fractions is less preferred than the treatment of flour fractions because of the greater likelihood of large particles, and the consequent possibility of process problems resulting therefrom, in bran fractions. Oat fractions, especially flour fractions, may be subjected to single or multiple treatments under the influence of centrifugal forces to produce a variety of products as has been disclosed hereinbefore for fractions derived from comminuted groats. The centrifugal force may be applied by means of for example hydrocyclones or continuous centrifuges.

In a particular embodiment of the processes of the present invention, a flour fraction is subjected to the influence of centrifugal force in a centrifuge. After separation of the solvent, e.g. hexane, the cake of solid material obtained may be selectively split into fractions of widely varying protein content, as is exemplified hereinafter. For example by single or multiple use of centrifuges, or the use of hydrocyclones followed by the use of centrifuge, and selective separation of the centrifuge cake thus obtained into fractions, fractions having protein contents of greater than 50%, especially greater than 80%, and/or less than 5.0%, especially less than 2.5%, are obtainable. Techniques for the selective splitting of a centrifuge cake into fractions are known. For example a basket centrifuge may be used as the centrifuge and the fractions may be split out of the basket using a knife blade, as is known for basket centrifuges. Flour fractions derived from oats and having high or low protein contents are believed to be particularly viable articles of commerce.

As stated hereinabove comminuted groats may be separated into fractions using a continuous centrifuge. A preferred embodiment of a continuous centrifuge is a so-called solid bowl centrifuge equipped with a screw conveyer. A number of variables may be important in the control of the operation of such a centrifuge according to the process of the invention, including for example the flow rate of the slurry of comminuted oats to the centrifuge, the depth of the liquid pool in the bowl of the centrifuge, the placement of the inlet to the bowl and the rotational speed of the bowl and of the screw.

The products of the embodiments of the process of the present invention include fractions, derived from flour fractions, which are protein-enriched flour or protein-deficient flour. The protein-enriched flour may have a protein content of greater than 50% and especially greater than 80%. The protein-deficient flour may have a protein content of less than 5.0% and especially less than 2.5%. The embodiments used to obtain such protein-enriched flour or protein-deficient flour may involve the multiple use, at least in part, of centrifuges and hydrocyclones.

In general in the embodiments of the process of the present invention, at least one fraction obtained will comprise at least 20% of the comminuted groats or of an oat fraction derived therefrom.

In the separation of oats into a variety of fractions using the influence of centrifugal forces, whether on comminuted groats per se or on fractions derived from comminuted groats, it is preferable, at least in so far as the separation of fractions of high protein content is concerned, that the oats, comminuted groats or fractions derived threfrom not be subjected to heat treatment. Thus in a preferred embodiment of the present invention it is preferable not to subject oats to heat treatment for drying purposes or to subject oat fractions to heated solvents. Such heating processes have been used to for example prevent subsequent oil rancidity in processes known heretofore. The absence of heat treatments in the processes of the present invention is believed to facilitate separation of products of differing protein content.

In the processes of the present invention it is preferred that water not be added to the admixtures of comminuted groats, or fractions derived therefrom, and solvent. As exemplified hereinafter, the addition of water may adversely affect the separation of the fractions. Although water is preferably not added to admixtures of comminuted oats, and fractions derived therefrom, and solvent, it is not necessary to remove water naturally present in the oats. In fact removal of such water by the use of a heat treatment adversely affects the separation of fractions, as discussed hereinabove.

The products obtained in the process described herein are believed to be commercially viable products. The bran fraction, with or without added protein, may be useful, for example, in breakfast cereals, as a filler for meat products or pet foods or in the manufacture of textured vegetable protein. The flour is capable of being used as such or when enriched with protein, for example, in breakfast cereals, meat products, baby foods, cakes, pastries and cookies, as a nutritional fortifier for wheat flour and as a substitute for skim milk powder in ice cream and other dairy products. The gum is capable of being extracted from the bran with, for example, hot water and recovered for use as a binder or thickener in the food industry, for example, in ice cream, cheese and meat products. The oil is capable of being used as, for example, a vegetable oil.

The present invention is illustrated by the following examples.

Dehulled Hinoat oats, obtained from Agriculture Canada, Ottawa, Ontario, were comminuted on an ALPINE CONTRAPLEX™ pinmill operating at approximately 19000 rpm. 1000 Grams of the comminuted groats were admixed with 6.06 liters of hexane and maintained in the form of a slurry for 15 minutes. The slurry was then passed through a hydrocyclone (DORR-OLIVER DOXIE TYPE A IMPURITY ELIMINATOR™). The inlet pressure on the hydrocyclone was varied. For each inlet pressure samples of so-called flour fraction were obtained from the overflow of the hydrocyclone over a period of 20 seconds. The samples were centrifuged so as to separate the solids and the solids so obtained were dried in a vacuum oven. In all cases the dried solids, which may be classified as protein-enriched flour, were white; in comparison the comminuted groats were buff coloured. The dried solids were analyzed for protein content (nitrogen x 6.25) using macro Kjeldahl analysis.

The results were as follows:

| Material | Hydrocyclone Inlet Pressure (kg/cm$^2$) | Weight of Solids (g) | Protein (%) |
|---|---|---|---|
| Comminuted Groats | — | 1000 | 24.1 |
| Overflow Solids #1 | 0.7 | 5.65 | 66.4 |
| Overflow Solids #2 | 1.4 | 6.69 | 68.0 |
| Overflow Solids #3 | 2.1 | 8.39 | 71.1 |

This example illustrates the separation of protein-enriched flours from comminuted groats and the effect of different pressures at the inlet of the hydrocyclone on such separation.

EXAMPLE II

1000 Grams of comminuted groats obtained by pinmilling dehulled Hinoat oats using the procedure of Example I were admixed with 6.06 liters of hexane and maintained in the form of a slurry for 15 minutes. The slurry was then passed through the hydrocyclone of Example I using an inlet pressure of 1.4 kg/cm$^2$, the slurry being separated into an overflow or so-called flour fraction and an underflow or so-called bran fraction. An additional liter of hexane was then passed through the hydrocyclone so as to remove any residual amounts of the slurry. The overflow and underflow were each centrifuged so as to separate the solids. The solids from the overflow were re-admixed with 0.5 liters of hexane, to remove any residual oil, and then re-centrifuged. The resultant overflow solids and the underflow solids were dried in a vacuum oven and analyzed for protein content. The results were as follows:

| Material | Weight of Solids (g) | Protein (%) | Colour |
|---|---|---|---|
| Comminuted Groats | 1000 | 24.1 | buff |
| Overflow Solids | 92 | 65.5 | white |
| Underflow Solids | 849 | 20.5 | buff |

EXAMPLE III

2500 Grams of comminuted groats obtained by pin-milling dehulled Hinoat oats using the procedure of Example I were admixed with 15 liters of hexane and maintained in the form of a slurry for 15 minutes. The slurry was then passed through the hydrocyclone of Example I using an inlet pressure of 1.4 kg/cm$^2$; 0.1 liters of hexane was subsequently passed through the hydrocyclone so as to remove residual slurry from the hydrocyclone. The overflow from the hydrocyclone was passed through a 325 TYLER™ mesh screen to remove any large particles in the overflow and then centrifuged to separate the solid material from the hexane. The solid material was re-admixed with hexane, to remove residual oil, and then re-centrifuged. The solid material so obtained was dried in a vacuum oven to give the product referred to hereinbelow as Product #1.

Two liters of hexane were added to the underflow from the hydrocyclone and the resultant solution was passed through a 20 TYLER mesh screen and then through a 30 TYLER mesh screen. The solid matter retained on the two screens were dried separately in a vacuum oven. The products obtained are referred to hereinbelow as Product #2 and Product #3 respectively.

A further 2 liters of hexane were added to the underflow solution that had passed through the 30 TYLER mesh screen. The resultant solution was passed through the hydrocyclone again using an inlet pressure of 1.4 kg/cm$^2$. The resultant overflow was passed through a 325 TYLER mesh screen, centrifuged and the solids obtained were admixed with hexane and re-centrifuged. The solid material thus obtained was dried. This product is referred to hereinbelow as Product #4. The underflow was passed through a 325 TYLER mesh screen. The material (bran) retained on the screen was dried and is referred to hereinbelow as Product #5. The solution that passed through the screen was centrifuged, and the solids obtained were admixed with hexane and re-centrifuged. The solid material thus obtained was dried. This product is referred to herein below as Product #6.

All the products were analyzed for protein content. The results obtained were as follows:

| Material | Weight (g) | Protein (%) | Colour |
|---|---|---|---|
| Comminuted Groats | 2500 | 17.1 | buff |
| Product #1 | 191 | 50.9 | white |
| Porduct #2 | 276 | 16.8 | buff |
| Product #3 | 137 | 16.9 | buff |
| Product #4 | 104 | 55.6 | white |
| Product #5 | 295 | 14.7 | buff |
| Product #6 | 989 | 8.4 | white |

Products #1, #4 and #6 may be generally classified as flour fractions and are of differing protein contents. The remaining products may be generally classifed as bran fractions.

EXAMPLE IV

2500 Grams of comminuted groats obtained by hammer-milling and then pinmilling dehulled Hinoat oats were admixed with 15 liters of hexane and maintained in the form of a slurry for 15 minutes. The slurry was then passed through the hydrocyclone of Example I using an inlet pressure of 1.4 kg/cm$^2$. The overflow from the hydrocyclone was centrifuged to separate the solids. The solids were re-admixed with hexane, re-centrifuged and the solids thus obtained (protein concentrate) were dried in a vacuum oven. The underflow from the hydrocyclone was passed through a 200 TYLER mesh and then a 325 TYLER mesh sieve. The material (bran) retained on the two sieves was combined and dried in a vacuum oven. The underflow, after the sieving, was centrifuged and the solids obtained were re-admixed with hexane and re-centrifuged. The solids thus obtained (flour) were dried in a vacuum oven. All the hexane solutions were combined and the oil was recovered therefrom by removal of hexane in a single stage evaporator operated at 100° C. and at atmospheric pressure.

The results were as follows:

| Material | Weight (g) | Protein (%) | Colour |
|---|---|---|---|
| Comminuted Groats | 2500 | 17.5 | buff |
| Protein Concentrates | 103 | 61.3 | white |
| Bran | 750 | 21.0 | buff |
| Flour | 1265 | 12.1 | white |
| Oil | 169 | — | green |

EXAMPLE V

Heat-treated (dried) dehulled Hinoat groats were comminuted using a commerical hammer mill. Using a batch process samples of the comminuted groats obtained were admixed, in the form of a slurry, with hexane for approximately 15 minutes and then passed through a SWECO™ Vibro Energy Separator equipped with a 200 mesh TYLER screen. The so-called flour fraction, which passed through the screen, was centrifuged to separate the flour from the hexane miscella. The flour was then dried overnight in a rotary vacuum drier.

Approximately 2 kg of the flour were admixed, in the form of a slurry, with 10 liters of a solvent for a period of 15 minutes. The slurry was then passed through a 10 mm DORR-OLIVER DOXIE TYPE A hydrocyclone at an inlet pressure of 2.8 kg/cm². The solid material in the overflow, high protein flour, and the solid material in the underflow, low protein flour, from the hydrocyclone were separately centrifuged from the solvent, washed with fresh solvent and dried in a rotary vacuum drier. The high and low protein flours were analyzed for protein using a Kjel-Foss Automatic 16210 protein analyzer.

Details of the solvents used and the results obtained were as follows:

| Solvent | High Protein Flour** | | Low Protein Flour | |
|---|---|---|---|---|
| | Wt(g) | Protein(%) | Wt(g) | Protein(%) |
| Methanol | 110 | 41.4 | 1665 | 13.9 |
| Ethanol*** | 314 | 24.6 | 1473 | 15.3 |
| 2-Propanol | 280 | 22.5 | 1466 | 14.2 |
| Pentane | 25 | 51.9 | 1836 | 15.7 |
| Heptane | 50 | 55.9 | 1750 | 16.9 |
| Cyclohexane | 140 | 38.2 | 1670 | 14.6 |

*denotes trade mark
**The starting material, flour, contained 17.6% protein
***Denatured alcohol containing 85% ethanol and 15% methanol was used.

EXAMPLE VI

Approximately 2 kg of dehulled Hinoat groats that had been comminuted on a commercial hammer mill were admixed, in the form of a slurry, with solvent for 15 minutes. The slurry was then passed through a SWECO Vibro Energy Separator equipped with a 200 mesh TYLER screen. The oversize material, bran, retained on the screen was dried in a rotary vacuum drier. The slurry of flour in solvent miscella was passed through a 10 mm DORR-OLIVER DOXIE TYPE A hydrocyclone at an inlet pressure of 2.8 kg/cm². The overflow from the hydrocyclone was collected. The underflow was passed through the hydrocyclone again and the overflow obtained was combined with that obtained previously. The underflow thus obtained, which contained low protein flour, was centrifuged, rinsed with fresh solvent and dried in a rotary vacuum drier. The combined overflows, which contained high protein flour were similarly centrifuged, rinsed and dried. The solvent miscella obtained was passed through a rotary evaporator to recover the oil. The oil obtained was dried in a vacuum oven. The flour and bran fractions obtained were analyzed for protein using a Kjel-Foss Automatic 16210 protein analyzer.

Details of the solvents used and he results obtained were as follows:

| Run Solvent | A* Methanol | B* Cyclohexane |
|---|---|---|
| Bran | | |
| weight(g) | 755 | 692 |
| protein(%) | 23.2 | 21.1 |
| High Protein Flour | | |
| weight(g) | 47 | 128 |
| protein(%) | 39.7 | 42.7 |
| Low Protein Flour | | |
| weight(g) | 1213 | 600 |
| protein(%) | 15.5 | 13.8 |
| Oil | | |
| weight(g) | 52 | 166 |

*the starting material, comminuted groats, contained 19.3% protein.

EXAMPLE VII

Approximately 250 g of pinmilled dehulled Hinoat groats were stirred, as a slurry, with 400 g of hexane at ambient temperature for five minutes and then passed through a 200 mesh TYLER screen. The oversized material, bran, retained on the screen was admixed, in the form of a slurry, with 200 g of hexane and re-screened. The undersized material, flour, from both screenings were combined, centrifuged and the hexane miscella was decanted off. The flour so obtained was admixed, in the form of a slurry with 125 ml of hexane, poured into two extraction thimbles, each measuring 43×123 mm, located in separate 250 ml centrifuge cups and centrifuged at 1000 G for 10 minutes. The hexane was decanted off. The thimbles were cut open and analytical-size samples (First Centrifuge samples) were taken from the top, middle and bottom sections of the cake of solid material in the thimble. Each of the cakes were then separated into "top-half" and "bottom-half" fractions. One "top-half" fraction and one "bottom-half" fraction were separately admixed, in the form of a slurry, with 30 ml of hexane and re-centrifuged at 1000 G. Analytical samples (Second Centrifuge Top-Half and Bottom-Half samples) were again taken from the top, middle and bottom sections of the cake of solid material obtained. The second "top-half" and "bottom-half" fractions were separately admixed with 30 ml of hexane in a WARING™ Blender for 5 minutes and then re-centrifuged at 1000 G. Once again analytical samples (Blender-Centrifuge Top-Half and Bottom-Half samples) were taken from the top, middle and bottom sections of the cake of solid material obtained.

All samples were dried in a vacuum oven and analyzed for protein and a Kjel-Foss Automatic 16210 Analyzer.

The results were as follows:

| | Location of Analyzed Sample | Protein in Sample (%) |
|---|---|---|
| First Centrifuge Samples | Top | 83.0 |
| | Middle | 6.2 |
| | Bottom | 10.2 |
| Second Centrifuge Samples | | |
| (a) Top-Half | Top | 56.9 |
| | Middle | 6.4 |
| | Bottom | 7.6 |
| (b) Bottom-Half | Top | 15.4 |
| | Middle | 2.2 |
| | Bottom | 2.8 |
| Blender Centrifuge Samples | | |
| (a) Top-Half | Top | 88.6 |
| | Middle | 7.7 |
| | Bottom | 7.6 |
| (b) Bottom-Half | Top | 21.4 |
| | Middle | 2.2 |
| | Bottom | 2.7 |

The analyses of the "top" fractions of the Second Centrifuge and Blender centrifuge samples indicate the effect of the high shear in the Wearing blender on protein content of fractions. The example also shows that fractions of high and low protein content are obtainable.

EXAMPLE VIII

Approximately 200 g of pinmilled Hinoat groats which had not been subjected to any heat treatment, were admixed, in the form of a slurry, with 500 g of hexane for five minutes and then passed through a 200 mesh TYLER screen. The oversized particles, bran, retained on the screen were admixed, in the form of a slurry with a further 200 g of hexane for five minutes and re-screened. The undersized material, flour, and hexane miscella from both screenings were combined and centrifuged. The hexane miscella was decanted off and the solid material admixed, in the form of a slurry, with a further 130 g of hexane. Portions of the slurry were poured into 43×123 mm extraction thimbles located in 250 ml centrifuge cups and centrifuged for 10 minutes at specific centrifugal forces. The hexane was decanted off and the thimbles were permitted to air-dry for ten minutes. Analytical-size samples were then taken from the top, middle and bottom sections of the cake of solid material in the thimble. These samples were dried and analyzed for protein content using a Kjel-Foss Automatic 16210 protein analyzer.

The above procedure was repeated using pinmilled groats that had been heat-treated at 95° C. in a forced-air oven for one hour prior to the initial admixing with hexane.

Using a different sample of pinmilled groats, the above procedure was repeated on pinmilled groats that had not been subjected to heat treatment and on pinmilled groats that, after the initial admixing with hexane, were heated for one hour in the hexane under reflux conditions (68° C.).

The above procedure was also repeated using a flour fraction that had been obtained from hammer milled groats by screening a slurry of the hammer milled groats in hexane, separating and drying the flour fraction in an oven.

The results obtained were as follows:

| Run | A | B | C | D | E |
|---|---|---|---|---|---|
| Starting Material |  |  |  |  |  |
| Protein(%) | 20.2 | 20.2 | 17.2 | 17.2 | 17.1 |
| Heat Treatment | none | 95° C. | none | 68° C. | dried |
| Products |  |  |  |  |  |
| (a)Centrifugal Force 300 G |  |  |  |  |  |
| Protein(%) |  |  |  |  |  |
| (i) Top | 60.2 | 49.4 | 62.9 | 53.3 | 24.7 |
| (iii) Middle | 9.0 | 11.4 | 6.5 | 10.0 | 14.8 |
| (iv) Bottom | 5.1 | 7.9 | 4.0 | 4.8 | 13.5 |
| (b)Centrifugal Force 1000 G |  |  |  |  |  |
| Protein(%) |  |  |  |  |  |
| (i) Top | 64.6 | 42.3 | 80.6 | 47.2 | 24.5 |
| (ii) Middle | 8.3 | 15.1 | 6.3 | 6.6 | 14.9 |
| (iii) Bottom | 7.1 | 8.8 | 4.1 | 4.8 | 15.7 |

The above example indicates that heat treatment affects the separation of, in particular, fractions of high protein content.

EXAMPLE IX

Approximately 500 g of Hinoat groats that had been obtained using a commercial hammer mill were admixed in the form of a slurry with one litre of hexane for five minutes. The resultant admixture was then passed through a 200 mesh TYLER screen. The oversized material, i.e. that retained on the screen, was re-admixed with one litre of hexane for five minutes and rescreened. The flour fraction and hexane miscella from both screenings were combined and then centrifuged at 1000 G for 10 minutes. The hexane miscella was decanted off. The solid material were admixed, as a slurry, with 175 g of hexane, poured into four 43×123 mm extraction thimbles supported in 250 ml centrifuge cups and centrifuged at 1000 G for 10 minutes. The hexane was decanted off and the thimbles were cut open. Analytical-size samples (First centrifuge samples) were taken from the top, middle and bottom sections of the cake of solid material in the thimbles. The cakes were then split into "top-half" and "bottom-half" samples. The combined bottom-half samples were admixed, in the form of a slurry, with 90 g of hexane and centrifuged using the extraction thimbles as described above. Analytical-size samples (First Split Centrifuge samples) were taken from the top, middle and bottom sections of the cake of solid material obtained. Once again the cakes were split into "top-half" and "bottom-half" samples. The combined bottom-half samples were admixed with 45 g of hexane and the procedure was repeated using only one thimble. Analytical-size samples (Second Split Centrifuge samples) were again taken from the top, middle and bottom sections of the cake of solid material obtained. Yet again the cakes were split into "top-half" and "bottom-half" samples. The bottom half sample was admixed with 25 g of hexane and the above procedure repeated using a 33×94 mm extraction thimble. Analytical-size samples (Third Split Centrifuge samples) were again taken from the top, middle and bottom sections of the cake of solid material obtained. All samples were analyzed for protein using a Kjel-Foss Automatic 16210 Protein Analyzer.

The results were as follows:

| Sample | Protein Analysis (%) | | |
|---|---|---|---|
|  | Top | Middle | Bottom |
| First Centrifuge* | 80.9 | 7.7 | 4.9 |
| First Split Centrifuge | 16.8 | 2.4 | 3.1 |
| Second Split Centrifuge | 4.1 | 2.0 | 2.1 |
| Third Split Centrifuge | 2.5 | 1.6 | 1.7 |

*flour fraction contained 17.3% protein.

This example shows that flour fractions having protein contents of less than 3.0% and in particular less than 2.0% are obtainable.

EXAMPLE X

A sample of dehulled Scott groats was comminuted in a CASELLA TM grain mill using a 2.5 mm diameter circular hole screen. The comminuted groat was then reground on the CASELLA grain mill using a 1.0 mm diameter circular hole screen. 150 g of the finely comminuted groats thus obtained were admixed, in the form of a slurry, with 300 g of hexane for 5 minutes. The slurry was then sieved with a 200 TYLER mesh screen. The material retained on the screen was re-admixed with 150 g of hexane for 5 minutes and re-sieved through the 200 TYLER mesh screen. The oversized material thus obtained i.e. that retained on the screen, was dried in a vacuum oven and analyzed for protein.

The undersized material i.e. that passing through the screen in each instance, was combined and centrifuged for 10 minutes at 1000 G. The hexane miscella was decanted off and a composite sample of the solid material was analyzed for protein. The remaining solid material was re-admixed, as a slurry, with 75 g of hexane, poured into a 43×123 mm extraction thimble supported in a 250 ml centrifuge cup and centrifuged at 1000 G for 10 minutes. The hexane was decanted off. The thimble was cut open, the length of the centrifuge cake was measured and analytical samples, for protein analysis, were taken from the top, middle and bottom sections of the cake. All protein analyses were carried out on dried samples using a Kjel-Foss Automatic 16210 protein analyzer.

The oil from the hexane miscella was recovered using a rotary evaporator.

Details of the results obtained are given below. The centrifuge cake of undersized material (flour) was white in colour the oversized material (bran) was buff-coloured and the oil was turbid green.

| | | |
|---|---|---|
| Protein Content of Scott groats | | 16.5 % |
| Weight of Oil | | 7.3 g |
| Oversized Material (bran) | | |
| Weight | | 64.4 g |
| Protein Content | | 21.4 % |
| Undersized Material (flour) | | |
| Composite Protein Content | | 13.4 % |
| Cake Depth | | 48 mm |
| Protein Content - | Top | 75.4 % |
| | Middle | 6.1 % |
| | Bottom | 4.1 % |

EXAMPLE XI

Approximately 300 g of pinmilled Hinoat groat was admixed, in the form of a slurry, with 600 g of hexane for 5 minutes. The slurry was then sieved with a 200 TYLER mesh screen. The material retained on the screen was re-admixed with 300 g of hexane for 5 minutes and re-sieved through the 200 TYLER mesh screen. The oversized material thus obtained, i.e. that retained on the screen, was dried in a vacuum oven and analyzed for protein.

The undersized material i.e. that passing through the screen in each instance, was combined and centrifuged for 10 minutes at 1000 G. The hexane miscella was decanted off and a composite sample of the solid material was analyzed for protein. The remaining solid material was re-admixed, as a slurry, with 150 g of hexane and then divided into three portions.

One portion was poured into a 43×123 mm extraction thimble supported in a 250 ml centrifuge cup and centrifuged at 1000 G for 10 minutes. The hexane was decanted off. The thimble was cut open and analytical samples, for protein analysis, were taken from the top, middle and bottom sections of the cake.

3.4 of water (30% by weight on a protein basis) were added to a second portion of the above slurry. The procedure used for the first portion was then repeated for the second portion.

The procedure for the second portion was repeated on the third portion of the slurry except that 11.25 g (100% by weight on a protein basis) of water were added.

All protein analyses were carried out on dried samples using a Kjel-Foss Automatic 16210 protein analyzer.

The oil from the hexane miscella was recovered using a rotary evaporator.

Details of the results obtained were as follows:

| | | | |
|---|---|---|---|
| Protein Content of Groats | 17.3% | | |
| Weight of Oil | 19.2 g | | |
| Oversized Material (bran) | | | |
| Weight | 118 G | | |
| Protein Content | 20.9% | | |
| Undersized Material (flour) | | | |
| Composite Protein Content | 14.1% | | |
| Portion | 1 | 2 | 3* |
| Water Content (%) | 0 | 30 | 100 |
| Protein Content | | | |
| - Top | 66.1 | 60.2 | 80.9 |
| - Middle | 7.1 | 7.1 | 6.6 |
| - Bottom | 4.4 | 4.4 | 4.0 |

*Portion 3 showed indications of becoming gelatinous. The centrifuge cake obtained showed indications of a plurality of layers differing slightly in colour.

EXAMPLE XII

A sample of Hinoat groats were passed two times through a COMOMIL® comminution mill equipped with a punched hole screen having 1.9 mm diameter holes. Approximately 36 kg of the comminuted groats thus obtained were fed to a mixing tank at 225 g/min together with hexane at 600 cm$^3$/min. The resultant admixture was passed through a SWECO Vibro Energy separator equipped with a 200 mesh TYLER screen. The oversized material retained on the screen was comminuted further and fed to the SWECO separator again. The combined material passing through the separator contained 16.5%, by weight, of solids. The solids contained 21.2% protein.

The combined material was fed, as a slurry, to the "liquid discharge" end of a six inch BIRD* centrifuge, a solid bowl centrifuge equipped with a screw conveyer, at a rate of 25 liters/min. The centrifuge was operated at 5000 rpm with a liquid pool depth of 0.37 cm.

Two streams were discharge from the BIRD centrifuge, centrifuged to separate solids from liquid and analyzed. The liquor discharge stream was a 4.0% solids stream in which the solids contained 77.3% protein. The solids discharge stream was a 77.2% solids stream in which the solids contained 8.4% protein.

The example shows the use of a relatively large scale centrifuge in the separation of comminuted oats into fractions differing in protein content.

I claim:

1. A process for the separation of comminuted oats into fractions differing in composition, said process comprising:
    (a) admixing comminuted dehulled oats or matter derived therefrom with an organic solvent in the form of a slurry, said solvent being selected from the class consisting of pentane, hexane, heptane, cyclohexane, alcohols having 1–4 carbon atoms, and mixtures thereof capable of extracting oat oil from said oats;
    (b) forming a slurry of said admixture of comminuted oats and solvent; and
    (c) subjecting the slurry to the influence of centrifugal force whereby the comminuted oats in said slurry are separated into at least two fractions, said fractions differing in composition.

2. The process of claim 1 in which one of said fractions contains at least 20% of the comminuted oats.

3. The process of claim 2 in which one fraction is flour, said flour being essentially free of bran.

4. The process of claim 2 in which one fraction is flour and the other fraction is comprised of bran.

5. The process of claim 4 in which said oats have not been subjected to a heat treatment.

6. The process of claim 5 in which the fraction comprised of bran is subjected to further comminution, admixed with said organic solvent in the form of a slurry and subjected to the influence of centrifugal force to separate the bran into two additional fractions, one of said additional fractions consisting essentially of flour.

7. The process of claim 1 in which the organic solvent is selected from the group consisting of pentane, hexane, heptane and cyclohexane, and mixtures thereof.

8. The process of claim 5 in which the slurry is subjected to the influence of centrifugal force in a hydrocyclone.

9. The process of claim 5 in which the slurry is subjected to the influence of centrifugal force in a continuous centrifuge.

10. The process of claim 9 in which the continuous centrifuge is a solid bowl centrifuge equipped with a screw conveyer.

11. The process of claim 3 in which a slurry of said flour and said organic solvent is subsequently subjected to the influence of centrifugal force to separate the flour into at least two additional fractions, said additional fractions differing in protein content.

12. The process of claim 5 in which the solvent is hexane.

13. The process of claim 1 in which the step (a) matter derived from comminuted oats is in admixture with the organic solvent.

14. The process of claim 13 in which at least one fraction so obtained is, in the form of a slurry with organic solvent, is subsequently subjected to the influence of centrifugal force to separate said additional fraction into at least two further fractions, said further fractions differing in protein content.

15. The process of claim 2 in which the protein content of one fraction so obtained is greater than 50%.

16. The process of claim 13 in which the protein content of one fraction so obtained is greater than 50%.

17. The process of claim 2 in which the protein content of one fraction so obtained is greater than 80%.

18. The process of claim 13 in which the protein content of one fraction so obtained is greater than 80%.

19. A process for the separation of comminuted oats into fractions differing in composition, said process comprising:

(a) admixing an oat fraction, derived from comminuted oats, with an organic solvent selected from the class consisting of pentane, hexane, heptane, cyclohexane, alcohols having 1–4 carbon atoms and mixtures thereof;

(b) subjecting said admixture to the influence of centrifugal force in a centrifuge and thereby forming a centrifuge cake of said oat fraction; and (c) separating said cake in the substantial absence of said solvent into at least two layers, the protein content of at least one of said layers being different from the protein content of at least one of said other layers.

20. The process of claim 19 in which the oat fraction is comprised of flour, said flour being substantially free of bran.

21. The process of claim 20 in which said oats have not been subjected to a heat treatment.

22. The process of claim 21 in which the organic solvent is selected from the group consisting of pentane, hexane, heptane and cyclohexane, and mixtures thereof.

23. The process of claim 22 in which the protein content of said one layer is greater than 50%.

24. The process of claim 22 in which the protein content of said one layer is greater than 80%.

25. The process of claim 21 in which the solvent is hexane.

* * * * *